US008186833B2

(12) United States Patent
Govil et al.

(10) Patent No.: US 8,186,833 B2
(45) Date of Patent: May 29, 2012

(54) METHOD AND SYSTEM FOR ELECTROHOLOGRAPHIC DISPLAY WITH ZEROTH-ORDER DIFFRACTION SUPPRESSION

(75) Inventors: Alok Govil, Santa Clara, CA (US); Remus Lucian Albu, Forest Hills, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 777 days.

(21) Appl. No.: 12/303,971

(22) PCT Filed: May 29, 2007

(86) PCT No.: PCT/IB2007/052016
§ 371 (c)(1),
(2), (4) Date: Dec. 9, 2008

(87) PCT Pub. No.: WO2007/141708
PCT Pub. Date: Dec. 13, 2007

(65) Prior Publication Data
US 2010/0238528 A1      Sep. 23, 2010

Related U.S. Application Data

(60) Provisional application No. 60/812,353, filed on Jun. 9, 2006.

(51) Int. Cl.
*G03H 1/08*      (2006.01)
(52) U.S. Cl. .................... 353/31; 359/9; 349/5
(58) Field of Classification Search ............ 359/1, 9–11, 359/22, 27, 30, 32; 353/8, 20, 31, 122; 349/5, 349/11, 201
See application file for complete search history.

(56) References Cited

U.S. PATENT DOCUMENTS 4,184,746 A    1/1980 Coale
(Continued)

FOREIGN PATENT DOCUMENTS

WO    WO2005059881 A2    6/2005

OTHER PUBLICATIONS

Lewis Banks et al., "Real-Time Diffractive Video Projector Employing Ferroelectric LCOS SLM", SID 2006, 2006 SID International Symposium, Society for Information Display, LO, vol. XXXVII, May 24, 2005, pp. 2018-2021, XP007012898.

(Continued)

*Primary Examiner* — Kevin Pyo
(74) *Attorney, Agent, or Firm* — Larry Liberchuk

(57) ABSTRACT

An electroholographic display system (300, 700) includes: a coherent light source (330, 730); a spatial light modulator (SLM) (320, 720) that modulates a coherent collimated light beam; and a processor and driver unit (310, 710) that generates hologram data and applies appropriate voltages to the pixels of the SLM to modulate the coherent collimated light beam with the hologram data and to suppress a zeroth order component of the modulated light beam at an image plane where the holographic image is reproduced. The processor and driver unit suppresses the zeroth order component of the modulated light beam by selecting the voltages to apply to the pixels of the SLM to cause a first group of pixels to provide a phase shift of 180 degrees to first portions of the collimated light beam with respect to portions of the collimated light beam modulated by a second group of pixels.

13 Claims, 7 Drawing Sheets

U.S. PATENT DOCUMENTS

| | | | |
|---|---|---|---|
| 5,119,214 A * | 6/1992 | Nishii et al. | 359/7 |
| 5,513,020 A | 4/1996 | Kato | |
| 6,233,071 B1 | 5/2001 | Orr | |
| 6,262,818 B1 | 7/2001 | Cuche | |
| 6,639,642 B1 | 10/2003 | Suzuki | |
| 2005/0063028 A1 | 3/2005 | Yasuda | |

OTHER PUBLICATIONS

Jun Amako et al., "Kinoform Using an electronically Controlled Birefringent Liquid-Crystal Spatial Light Modulator" Applied Optics, OSA, Optical Society of America, Washington, DC, vol. 30, No. 32, Nov. 10, 1991, pp. 4622-4628, XP000241786.

* cited by examiner

METHOD AND SYSTEM FOR ELECTROHOLOGRAPHIC DISPLAY WITH ZEROTH-ORDER DIFFRACTION SUPPRESSION

This invention pertains to electroholographic display systems, and more particularly to a method and system of electroholographic display with zeroth order diffraction suppression.

Holography is a method of recording and reproducing three-dimensional (3-D) images. In contrast with photography, which is generally a point-to-point recording and reproduction of the intensity (amplitude) of light rays that make up an image, in holography both the amplitude and the phase of the light (usually at one particular wavelength) are recorded. When reproduced, the resulting light field is identical to that which emanated from the original object or scene, giving a perfect three-dimensional image.

FIG. 1 illustrates a system 100 and method of recording a 3-D image of an object 25. System 100 includes a light source 110, beamsplitter 120, mirror 130, and image recording device 140. Beneficially, light source 110 is a laser or other coherent light generator. Image recording device 140 may be a photographic plate.

Operationally, light source 100 provides a coherent light beam to beamsplitter 120. Beamsplitter 120 passes a first portion of the coherent light beam to impinge upon object 25 as an illumination beam, and reflects a second portion of coherent light beam as a reference beam. Mirror 130 directs the reference beam toward image recording device 140. From the illumination beam, the object 25 produces an object beam which is combined with the reference beam at image recording device 140. Optical interference between the reference beam and the object beam, due to the superposition of the light waves, produces a series of intensity fringes. These fringes form a type of diffraction grating and are recorded on image recording device 140.

When the recorded image is reproduced, diffraction from the fringe pattern reconstructs the original object beam in both intensity and phase. Because both the phase and intensity are reproduced, the image appears three-dimensional; the viewer can move her viewpoint and see the image rotate exactly as the original object would.

Recently electroholographic display systems have been developed to generate full three-dimensional ("3-D") reconstructions of images. There is a strong interest in developing electroholographic display systems for reproducing moving images in 3-D, such as 3-D television. However, several problems remain.

As explained above, holograms generate diffracted beams of several orders (zeroth, first, second, third, and so on) from a reference beam. The zeroth order of the beam is almost un-diffracted and does not generate the image. However, the zeroth order in general carries the largest amount of energy of the reference beam, which is therefore wasted.

Methods exist for using the zeroth order beam for two-dimensional displays, for example as disclosed in U.S. Pat. No. 6,639,642. However these methods do not apply to 3-D holographic displays.

Meanwhile, U.S. Pat. No. 4,184,746 discloses a method for suppression of the zeroth order diffracted beam for improving image quality in two-dimensional cathode ray tube (CRT) displays by using transmissive phase-gratings. In this method, the phase of the light passing through the grated screen changes. The screen is grated so as to have different thicknesses at different parts of the screen. The light passing though the thicker portions receives more of a phase change than the light passing through the thinner portions.

FIG. 2 illustrates three waveforms 210, 220, and 230 all having a same frequency but with different phases. These are all basically the same waveform, shifted in time (along the direction of the arrow). Although waveforms 210 and 220 are the same shape except for the shift along the time axis, the time shift is such that—at the particular frequency of the waveforms—waveform 220 is 180 degrees out of phase with respect to waveform 210. Accordingly, addition of waveform 220 to waveform 210 results in cancellation. This is basically the principle that is used to suppress the zeroth order diffraction beam in U.S. Pat. No. 4,184,746.

However, in the method described in U.S. Pat. No. 4,184,746, the phase grating cannot be dynamically changed, because the thickness of the grated screen is fixed. This makes this arrangement unsuitable for electroholography used for generating moving images.

Accordingly, it would be desirable to provide an electroholographic display system with zeroth order diffraction suppression. It would further be desirable to provide a method of suppressing zeroth order diffraction in an electroholographic display system.

In one aspect of the invention, an electroholographic display system comprises: a coherent light source adapted to produce a coherent, collimated light beam; a spatial light modulator (SLM) adapted to receive and modulate the coherent collimated light beam to produce therefrom a modulated light beam; and a processor and driver unit adapted to generate hologram data representing a holographic image and to apply appropriate voltages to the pixels of the SLM to cause the SLM to modulate the coherent collimated light beam with the hologram data and to suppress a zeroth order component of the modulated light beam at an image plane where the holographic image is reproduced. The SLM includes a plurality of pixels, and is adapted to selectively provide a phase shift of 180 degrees to portions of the collimated light beam modulated by selected pixels. The processor and driver unit suppresses the zeroth order component of the modulated light beam by selecting the voltages to apply to the pixels of the SLM to cause a first group of pixels to provide a phase shift of 180 degrees to first portions of the collimated light beam with respect to portions of the collimated light beam modulated by a second group of pixels.

In another aspect of the invention, a method of displaying a holographic image comprises: providing a coherent, collimated light beam to a spatial light modulator (SLM) comprising a plurality of pixels; and applying appropriate voltages to the pixels of the SLM to cause the SLM to modulate the coherent collimated light beam with hologram data to produce therefrom a modulated light beam, and to suppress a zeroth order component of the modulated light beam at an image plane where the holographic image is displayed. Suppressing the zeroth order component of the modulated light beam at an image plane where the holographic image is displayed comprises selecting the voltages to apply to the pixels of the SLM to cause a first group of pixels to provide a phase shift of 180 degrees to first portions of the collimated light beam with respect to portions of the collimated light beam modulated by a second group of pixels.

Figure 3:
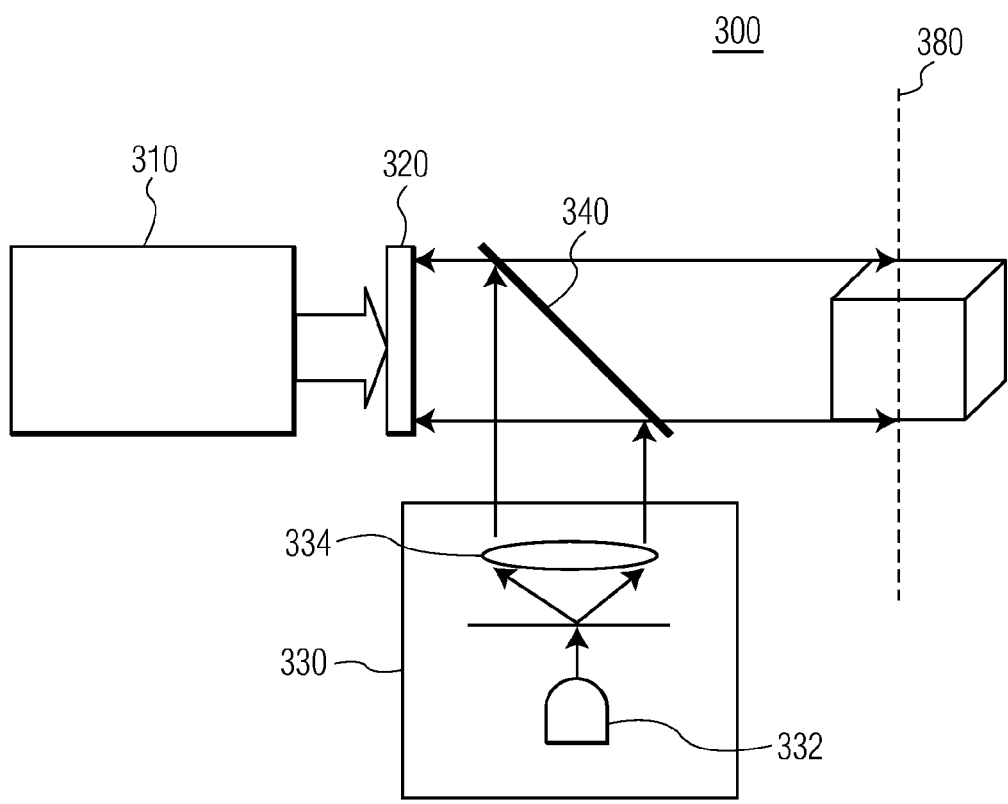
FIG. 3 shows an electroholographic display system with zeroth order suppression.
Figure 4A:
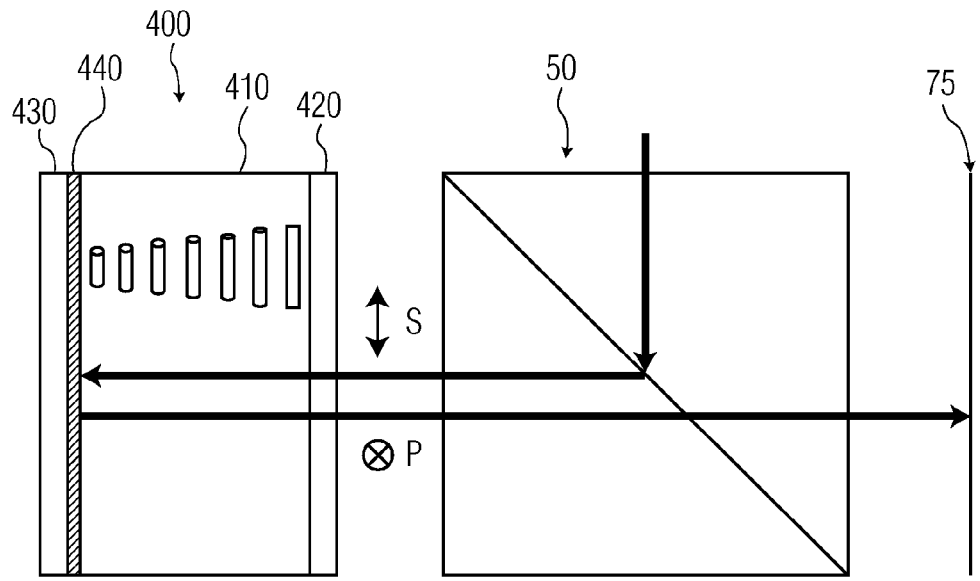
Figure 4B:
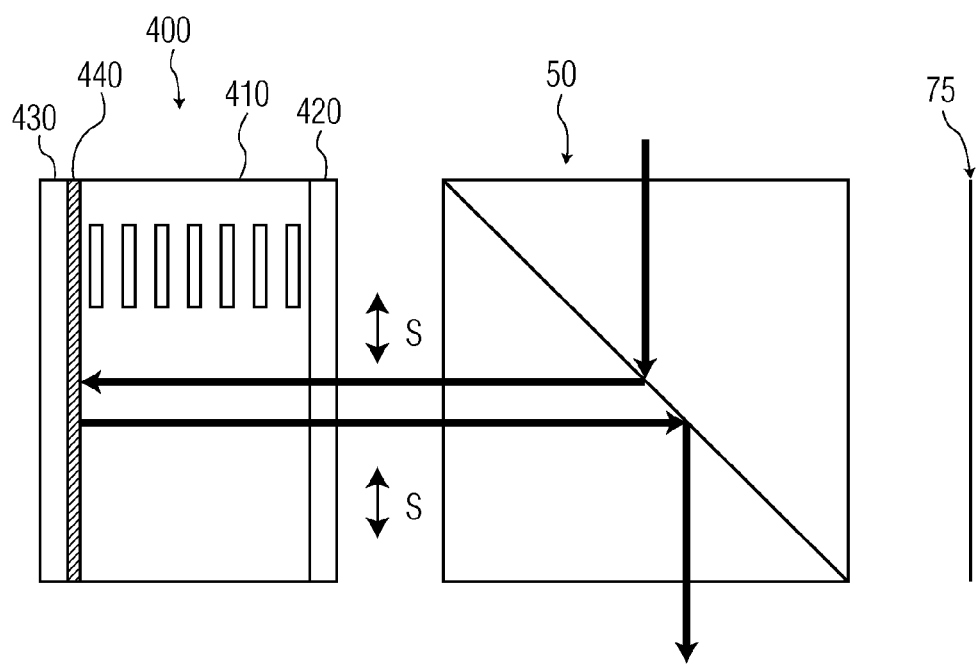
Figure 5:
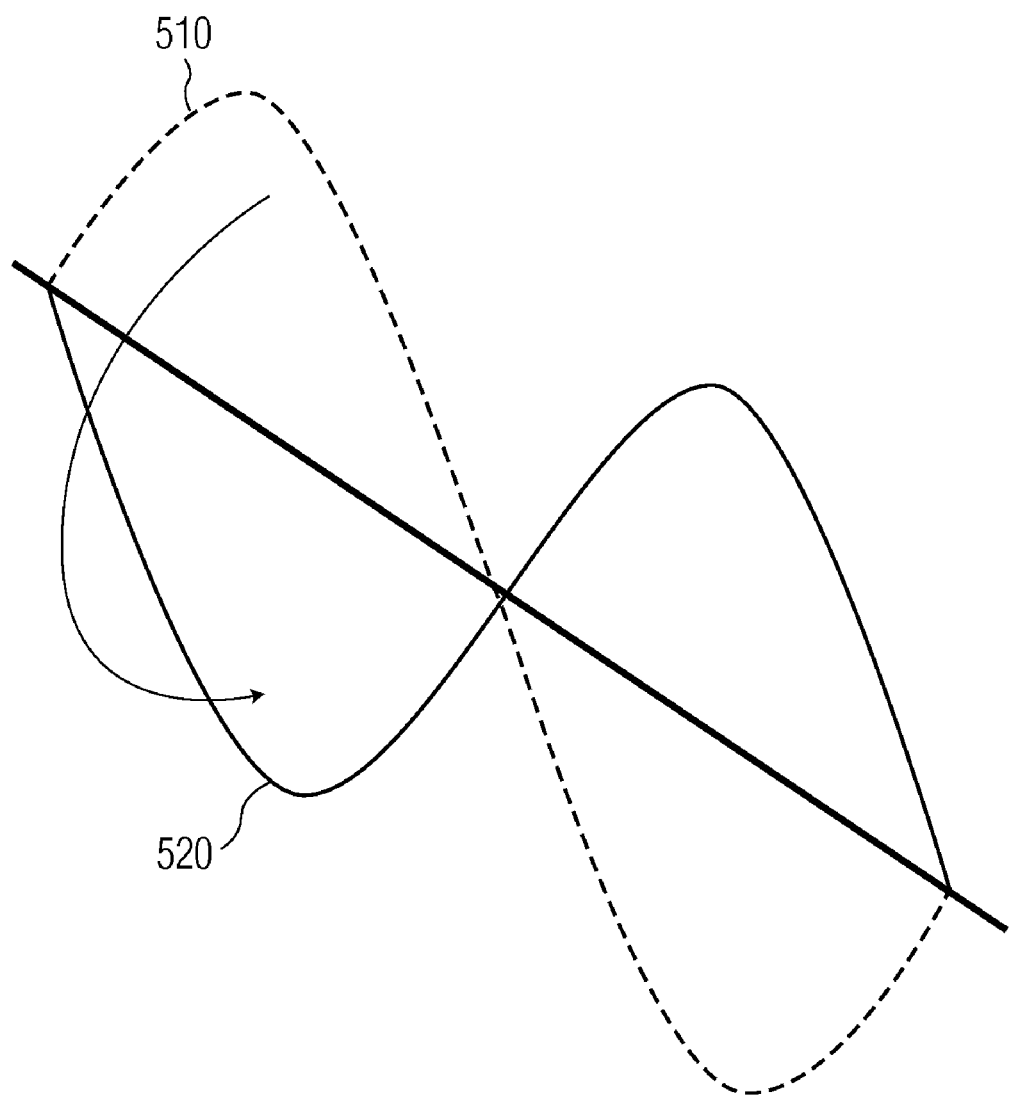
Figure 6A:
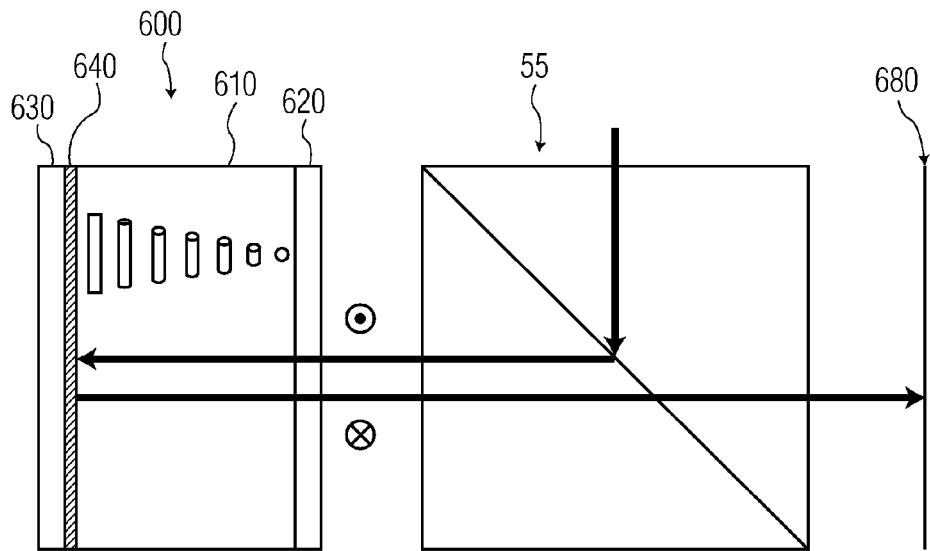
Figure 6B:
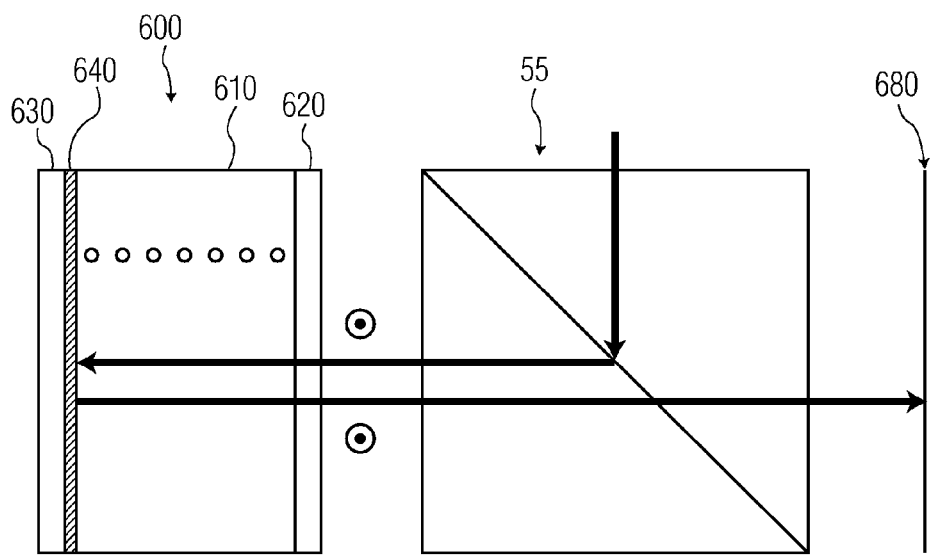
Figure 7:
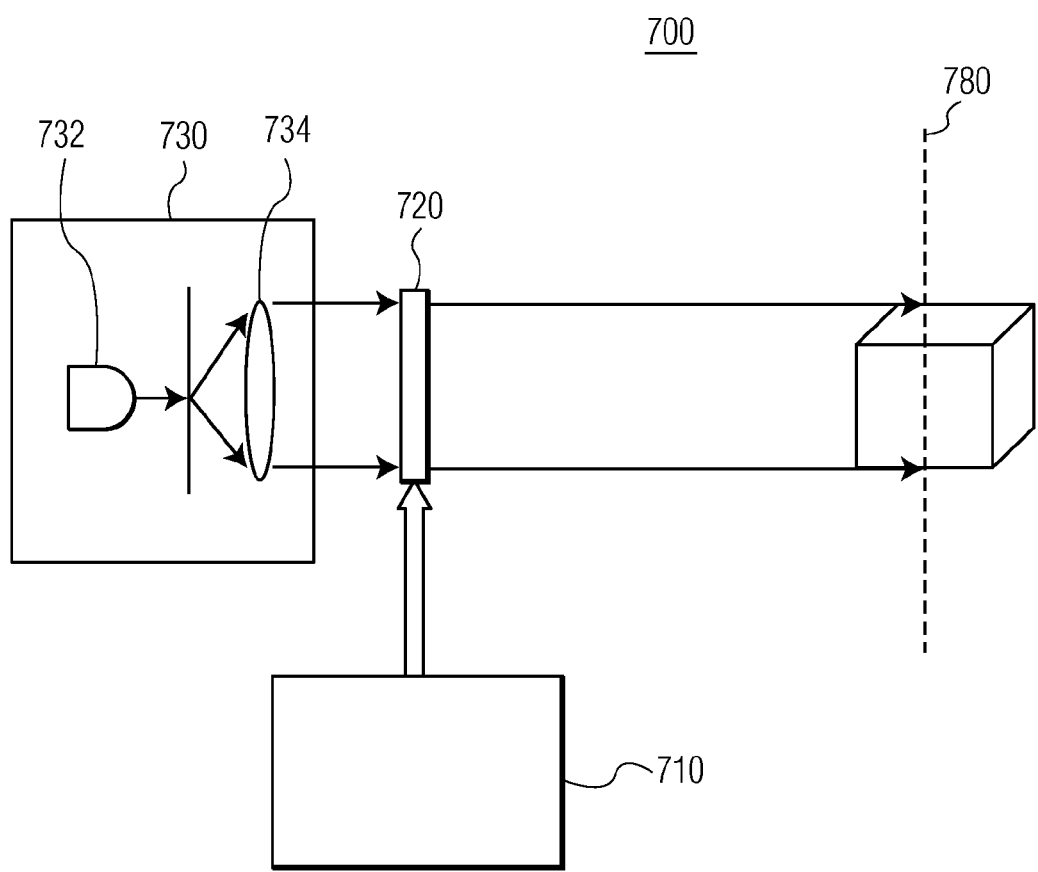
Figure 8A:
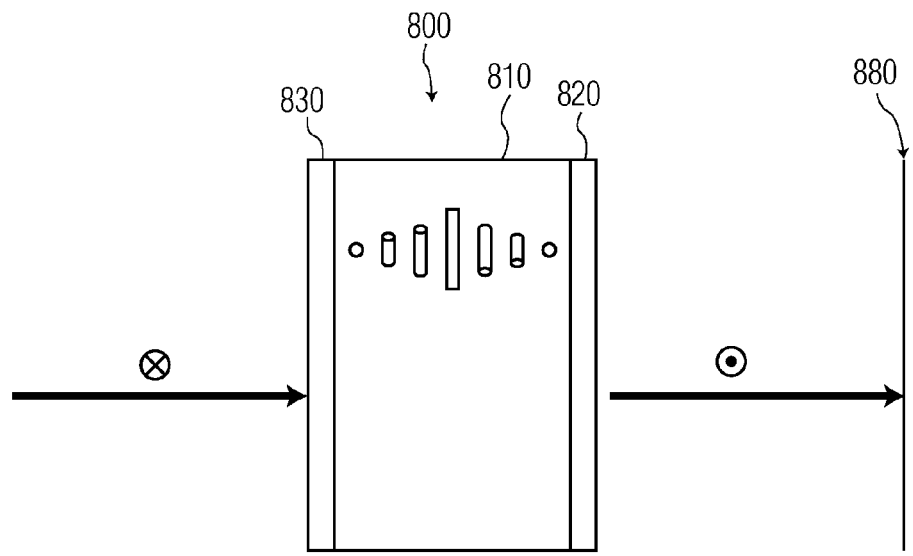
Figure 8B:
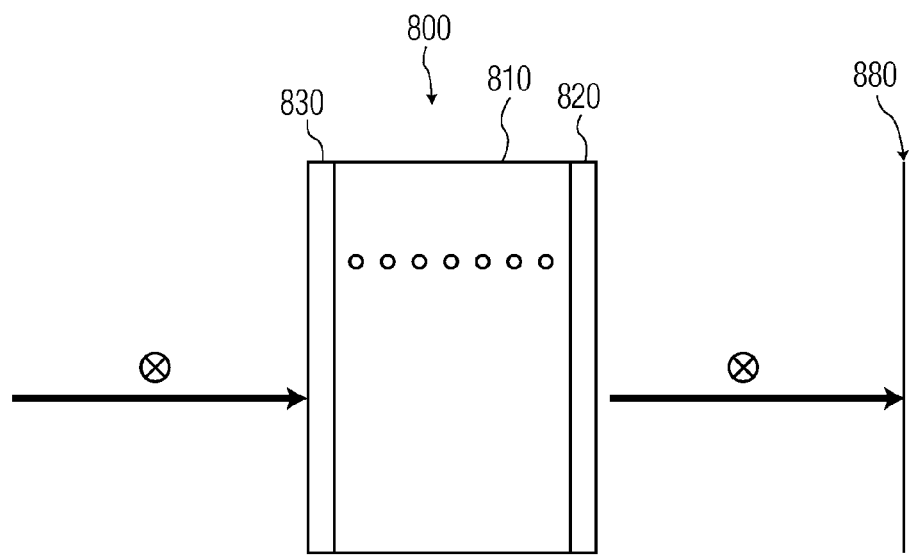

FIGS. 4A-B illustrates principles of operation of a reflective liquid crystal display (LCD) device;

FIG. 5 illustrates cancellation of a first waveform by addition of a second waveform;

FIGS. 6A-B illustrates principles of operation of a LCD device which may be employed as a spatial light modulator in the electroholographic display system of FIG. 3;

FIG. 7 shows a second embodiment of an electroholographic display system with zeroth order suppression;

FIGS. 8A-B illustrates principles of operation of a LCD device which may be employed as a spatial light modulator in the electroholographic display system of FIG. 7.

FIG. 3 shows one embodiment of an electroholographic display system 300 with zeroth order suppression.

Electroholographic display system 300 comprises a processor and driver unit 310, spatial light modulator (SLM) 320, coherent light source 330, and a beamsplitter 340. Processor and driver unit 310 may comprise separate circuits or components of the processor and the driver, and may include memory such as read only memory (ROM), random access memory (RAM), etc. Beneficially, software for executing various algorithms is stored in memory in processor and driver unit 310. Beneficially, SLM 320 is a reflective liquid crystal display (LCD), such as a reflective liquid crystal on silicon (LCOS) device. In one embodiment, coherent light source 330 comprises a laser emitting diode (LED) 332 and collimation optics 334. Alternatively, another laser generation device or other coherent light generator may be employed. In some embodiments, beamsplitter 340 may be omitted, provided that another means or optical configuration is provided for directing light from coherent light source 330 onto SLM 320, and modulated light from SLM 320 toward a desired image plane 380.

Operationally, LED 332 provides a light beam to collimation optics 334 which collimates and sizes the light beam appropriately for SLM 320. That is, beneficially, the light beam is sized and shaped so as to substantially completely illuminate all of the pixels of SLM 320 simultaneously (in contrast to so-called scanning-color systems). The coherent, collimated light beam from light source 330 is provided to beamsplitter 340, which directs the coherent, collimated light beam onto SLM 320. Meanwhile, processor and driver unit 310 generates hologram data and applies the data to drive the pixels of SLM 320. In response to the data driving each of the pixels of SLM 320, the coherent, collimated light beam is spatially modulated to generate a spatially modulated light beam which is reflected back to beamsplitter 340. Beamsplitter 340 passes the spatially modulated light beam therethrough to image plane 380. At image plane 380, the diffracted light from each of the pixels of SLM 320 adds together to produce the desired holographic image.

FIGS. 4A-B illustrate principles of operation of a reflective liquid crystal display (LCD) device 400. As shown in FIGS. 4A-B, reflective LCD 400 includes a liquid crystal (LC) material layer 410 disposed between first and second substrates 420, 430. First substrate 420 is transparent. Disposed on (although not necessarily directly on) second substrate 430 is a reflective material 440 such as an Aluminum layer. Beneficially, reflective material 440 forms reflective pixel electrodes which are applied with a voltage to turn on or off an associated pixel of LCD device 400. A polarizing beamsplitter 50 is provided in FIGS. 4A-B to direct light to and from the LCD device 400. In the example of FIGS. 4A-B, the liquid crystals of LC material layer 410 are normally twisted in a helix when no voltage is applied (FIG. 4A), and are aligned in a first linear direction when an electric field is applied (FIG. 4B).

FIG. 4A shows a case where no voltage is applied across the LC material layer 410. Operationally, polarizing beamsplitter 50 operates to reflect light having a first (p) polarization toward LCD device 400. In that case, the light impinging on LCD device 400 passes through transparent first substrate 420 and LC material layer 410 to reach the reflective pixel electrodes. In passing through LC material layer 410, the polarization of the light is rotated by 45 degrees, since the applied voltage is zero. The light is then reflected by the reflective pixel electrodes back through LC material layer 410 to emerge from transparent first substrate 420. In passing back LC material layer 410, the polarization of the light is rotated by an additional 45 degrees, yielding a total polarization rotation of 90 degrees. Accordingly, the light emerging from LCD device 400 is rotated 90 degrees (orthogonally polarized) with respect to the light entering LCD device 400, and has a second (s) polarization. Polarizing beamsplitter 50 is configured such that the light having the second (s) polarization passes therethrough, for example to a display screen 75.

Meanwhile, FIG. 4B shows a case where a voltage is applied across LC material layer 410 sufficient to align the liquid crystals along a first direction in parallel with the direction of the first polarization (p). In that case, the light passes through LC material layer 410, reflects back from the reflective pixel electrodes, and passes back through LC material layer 410 essentially without any change in polarization. Accordingly, the light emerging from LCD device 400 has the same first (p) polarization as the light entering LCD device 400. Polarizing beamsplitter 50 is configured such that the light having the first (p) polarization is reflected away from display screen 75.

Accordingly, LCD device 400 can act as a spatial light modulator which selectively modulates light in accordance with voltages that are selectively applied to each pixel in order to reproduce a desired image. To achieve the required 90 degree round-trip phase shift through LCD device 400, as explained above, beneficially LC material layer 410 comprises a twisted nematic 45 (TN-45) material.

Meanwhile, the pixels of LCD device 400 can be considered as individually controllable diffraction light sources. That is, not only do the pixels directly reflect light, but the pixels also diffract light at their edges. In a typical 2-D projection display system using LCD device 400, the diffracted light is undesirable and is typically filtered out by an optical system disposed in an optical path between LCD device 400 and a display screen.

However, if the LCD device 400 is employed in an electroholographic display system, then a large quantity of zeroth order light will be reflected to the image plane along with the desired diffracted light with produces the holographic image. As explained above, this is highly undesirable.

Figure 1:
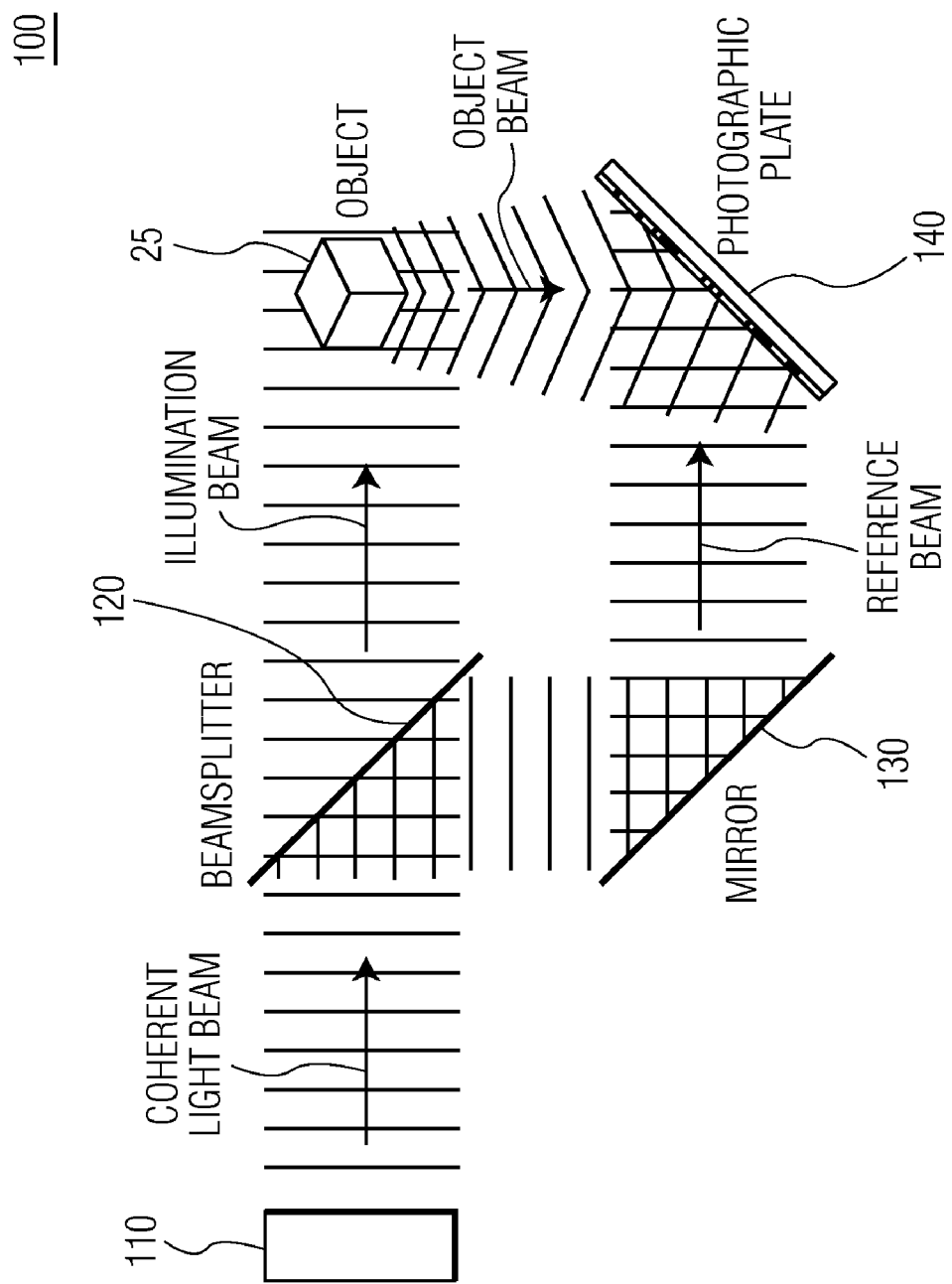
FIG. 1 illustrates a system and method of recording a 3-D image of an object.
Figure 2:
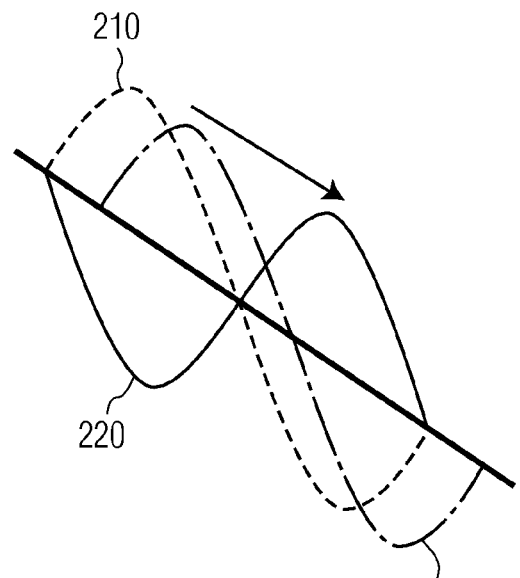
FIG. 2 illustrates three waveforms with different phases.

Therefore, to suppress the zeroth order diffraction beam, electroholographic display system 300 generates 180 degrees of phase shift for selected pixels by using SLM 320. This principle will now be explained with respect to FIG. 5. FIG. 5 illustrates cancellation of a first waveform 510 by addition of a second waveform 520. As seen in FIG. 5 first waveform 510 is rotated about the time axis to generate second waveform 520. It is understood that the cancellation effect shown in FIG. 5 is clearly different from what is shown in FIG. 2. For example, in the arrangement of FIG. 2, if the frequency of the waveforms 210 and 220 change, then it is necessary to adjust the time delay between waveforms 210 and 220 to maintain the 180 degree phase relationship between the waveforms and the cancellation effect. In contrast, in the arrangement of FIG. 5, since waveform 520 is obtained by a direct 180 degree phase rotation, rather than a time delay, even if the frequency of first waveform 510 changes, second waveform 520 remains 180 degrees out of phase with respect to waveform 510, and if added to waveform 510 still produces a cancellation.

Accordingly, to suppress the zeroth order beam in electroholographic display system 300, an SLM 320 is employed which can selectively phase shift light coming from some pixels by 180 degrees with respect to light coming from other pixels. With such an arrangement, processor and driver unit 310 can select a set of voltages for the pixels which provide a set of first order diffraction patterns that will add up at image plane 380 to produce the desired holographic image, while at the same time suppressing the undesired zeroth order energy though cancellation.

FIGS. 6A-B illustrate principles of operation of a reflective liquid crystal display (LCD) device 600 that can be employed as one embodiment of SLM 320 in electroholographic display system 300 to selectively produce 180 degrees of phase shift for light on a pixel-by-pixel basis.

As shown in FIGS. 6A-B, reflective LCD 600 includes a liquid crystal (LC) material layer 610 disposed between first and second substrates 620, 630. First substrate 620 is transparent. Disposed on (although not necessarily directly on) second substrate 630 is a reflective material 640 such as a metal layer. Beneficially, reflective material 640 forms reflective pixel electrodes which are supplied with a voltage to turn on or off an associated pixel of LCD device 600. A beamsplitter 55 is provided in FIGS. 6A-B to direct light to and from the LCD device 600. In the example of FIGS. 6A-B, the liquid crystals of LC material layer 610 are normally twisted in a helix when no voltage is applied (FIG. 6A), and are aligned in a first linear direction when an electric field is applied (FIG. 6B).

FIG. 6A shows a case where no voltage is applied across the LC material layer 110. Operationally, beamsplitter 55 operates to reflect light from a light source (not shown) toward LCD device 600. In that case, the light impinging on LCD device 600 passes through transparent first substrate 620 and LC material layer 610 to reach the reflective pixel electrodes. In passing through LC material layer 610, the polarization of the light is rotated by 90 degrees, since the applied voltage is zero. The light is then reflected by the reflective pixel electrodes back through LC material layer 610 to emerge from transparent first substrate 620. In passing back LC material layer 610, the polarization of the light is rotated by an additional 90 degrees, yielding a total phase rotation of 180 degrees. Accordingly, the light emerging from the LCD device 600 is rotated 180 degrees (opposite phase) with respect to the light entering the LCD device 600. Beamsplitter 55 is configured such that the light from LCD device 600 passes therethrough, for example to an image plane 680.

Meanwhile, FIG. 6B shows a case where a voltage is applied across LC material layer 610 sufficient to align the liquid crystals along a first direction in parallel with the direction of the first polarization (p). In that case, the light passes through LC material layer 610, reflects back from the reflective pixel electrodes, and passes back through LC material layer 610 essentially without any change in polarization. Accordingly, the light emerging from the LCD device 600 has the same polarization as the light entering the LCD device 600. Beamsplitter 55 is configured such that the light from LCD device 600 passes therethrough, for example to image plane 680.

Accordingly, LCD device 600 can act as a spatial light modulator which selectively modulates light in accordance with voltages that are selectively applied to each pixel in order to reproduce a desired image. To achieve the required 180 degree round-trip phase shift difference, LC material layer 610 comprises a twisted nematic 90 (TN-90) material.

With the LCD device 600, processor and driver unit 310 can select a set of voltages for the pixels which provide a set of first order diffraction patterns that will add up at image plane 380 to produce the desired holographic image, while at the same time suppressing the undesired zeroth order energy though cancellation by providing 180 degree phase shifts for light from a first set of pixels with respect to a second set of pixels. For example, in some cases, a "checkerboard pattern" similar to the pattern of U.S. Pat. No. 4,184,746, discussed above, can be employed.

FIG. 7 shows a second embodiment of an electroholographic display system 700 with zeroth order suppression.

Electroholographic display system 700 comprises a processor and driver unit 710, spatial light modulator (SLM) 720, and coherent light source 730. Processor and driver unit 710 may comprise separate circuits or components of the processor and the driver, and may include memory such as read only memory (ROM), random access memory (RAM), etc. Beneficially, software for executing various algorithms is stored in memory in processor and driver unit 710. Beneficially, SLM 720 is a transmissive liquid crystal display (LCD) device. In one embodiment, coherent light source 730 comprises a light emitting diode (LED) 732 and collimation optics 734. Alternatively, a laser or other coherent light generator may be employed.

Operationally, LED 732 provides a light beam to collimation optics 734 which collimates and sizes the light beam appropriately for SLM 720. That is, beneficially, the light beam is sized and shaped so as to substantially completely illuminate all of the pixels of SLM 720 simultaneously (in contrast to so-called scanning-color systems). The coherent, collimated light beam from light source 730 is provided to a rear substrate of SLM 720. Meanwhile, processor and driver unit 710 generates hologram data and applies the data to drive the pixels of SLM 720. In response to the data driving each of the pixels of SLM 720, the coherent, collimated light beam is spatially modulated to generate a spatially modulated light beam which is passed out of a front substrate of SLM 720 to image plane 780. At image plane 780, the diffracted light from each of the pixels of SLM 720 adds together to produce the desired holographic image.

As explained above, the pixels of SLM 720 can be considered as individually controllable diffraction light sources. That is, not only do the pixels directly pass light, but the pixels also diffract light at their edges. In a typical 2-D projection display system using SLM 720, the diffracted light is undesirable and is typically filtered out. However, in an electroholographic display system, the diffracted light ids desired and it is beneficial to suppress the zeroth order beam.

Therefore, to suppress the zeroth order diffraction beam, electroholographic display system 700 generates 180 degrees of phase shift for selected pixels by using SLM 720.

Accordingly, to suppress the zeroth order beam in electroholographic display system 700, an SLM 720 is employed which can selectively phase shift light coming from some pixels by 180 degrees with respect to light coming from other pixels. With such an arrangement, processor and driver unit 710 can select a set of voltages for the pixels which provide a set of first order diffraction patterns that will add up at image plane 780 to produce the desired holographic image, while at the same time suppressing the undesired zeroth order energy though cancellation.

FIGS. 8A-B illustrate principles of operation of a reflective liquid crystal display (LCD) device 800 that can be employed as one embodiment of SLM 720 in electroholographic display system 300 to selectively produce 180 degrees of phase shift for light on a pixel-by-pixel basis.

As shown in FIGS. 8A-B, reflective LCD 800 includes a liquid crystal (LC) material layer 810 disposed between first and second substrates 820, 830. First and second substrates 820, 830 are both transparent. Disposed on first and/or second substrates 820, 830 are pixel electrodes which are supplied with a voltage to turn on or off an associated pixel of LCD device 800. In the example of FIGS. 8A-B, the liquid crystals of LC material layer 810 are normally twisted in a helix when no voltage is applied (FIG. 8A), and are aligned in a first linear direction when an electric field is applied (FIG. 8B).

FIG. 8A shows a case where no voltage is applied across the LC material layer 810. In that case, the light impinging on LCD device 800 passes through transparent second substrate 830 and LC material layer 810 to reach the transparent first substrate 820. In passing through LC material layer 810, the polarization of the light is rotated by 180 degrees, due to the applied voltage being zero. Accordingly, the light emerging from the LCD device 800 is rotated 180 degrees (opposite phase) with respect to the light entering the LCD device 800. The light from LCD device 800 passes therethrough, for example, to an image plane 880.

Meanwhile, FIG. 8B shows a case where a voltage is applied across LC material layer 810 sufficient to align the liquid crystals along a first direction in parallel with the direction of the first polarization (p). In that case, the light passes through LC material layer 810 essentially without any change in polarization. Accordingly, the light emerging from the LCD device 800 has the same polarization as the light entering the LCD device 800. The light from LCD device 800 passes therethrough, for example to an image plane 880.

Accordingly, LCD device 800 can act as a spatial light modulator which selectively modulates light in accordance with voltages that are selectively applied to each pixel in order to reproduce a desired image. To achieve the required 180 degree round-trip phase shift difference, LC material layer 810 comprises a twisted nematic 180 (TN-180) material.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

The invention claimed is:

1. An electroholographic display system, comprising:
    a coherent light source adapted to produce a coherent, collimated light beam;
    a spatial light modulator (SLM) adapted to receive and modulate the coherent collimated light beam to produce therefrom a modulated light beam, the SLM including a plurality of pixels; and
    a processor and driver unit adapted to generate hologram data representing a holographic image and to apply appropriate voltages to the pixels of the SLM to cause the SLM to modulate the coherent collimated light beam with the hologram data and to suppress a zeroth order component of the modulated light beam at an image plane where the holographic image is reproduced,
    wherein the SLM is adapted to selectively provide a phase shift of 180 degrees to portions of the collimated light beam modulated by selected pixels, and
    wherein the processor and driver unit suppresses the zeroth order component of the modulated light beam by selecting the voltages to apply to the pixels of the SLM to cause a first group of pixels to provide a phase shift of 180 degrees to first portions of the collimated light beam with respect to portions of the collimated light beam modulated by a second group of pixels.

2. The system of claim 1, wherein the SLM is a reflective liquid crystal display (LCD) device including a twisted nematic 90 (TN-90) liquid crystal material.

3. The system of claim 2, further comprising a beamsplitter adapted to direct the coherent collimated light beam from the coherent light source to the reflective LCD device and to direct the modulated light beam from the reflective LCD device to an image plane.

4. The system of claim 1, where the SLM is a reflective liquid crystal on silicon (LCOS) device including a twisted nematic 90 (TN-90) liquid crystal material.

5. The system of claim 4, further comprising a beamsplitter adapted to direct the coherent collimated light beam from the coherent light source to the reflective LCOS device and to direct the modulated light beam from the reflective LCOS device to an image plane.

6. The system of claim 1, wherein the SLM is a transmissive liquid crystal display (LCD) device including a twisted nematic 180 (TN-180) liquid crystal material.

7. The system of claim 1, wherein the coherent light source includes a laser light generating device.

8. A method of displaying a holographic image, comprising:
    providing a coherent, collimated light beam to a spatial light modulator (SLM) comprising a plurality of pixels; and
    applying appropriate voltages to the pixels of the SLM to cause the SLM to modulate the coherent collimated light beam with hologram data to produce therefrom a modulated light beam, and to suppress a zeroth order component of the modulated light beam at an image plane where the holographic image is displayed,
    wherein suppressing the zeroth order component of the modulated light beam at an image plane where the holographic image is displayed comprises selecting the voltages to apply to the pixels of the SLM to cause a first group of pixels to provide a phase shift of 180 degrees to first portions of the collimated light beam with respect to portions of the collimated light beam modulated by a second group of pixels.

9. The method of claim 8, wherein the SLM is a reflective liquid crystal display (LCD) device including a twisted nematic 90 (TN-90) liquid crystal material.

10. The method of claim 8, where the SLM is a reflective liquid crystal on silicon (LCOS) device including a twisted nematic 90 (TN-90) liquid crystal material.

11. The method of claim 8, wherein the SLM is a transmissive liquid crystal display (LCD) device including a twisted nematic 180 (TN-180) liquid crystal material.

12. The method of claim 8, wherein the coherent light source includes a laser light generating device.

13. The method of claim 8, further comprising maximizing a first order diffraction component of the modulated light beam at an image plane where the holographic image is displayed.

* * * * *